United States Patent [19]

Calmettes et al.

[11] Patent Number: 4,750,242

[45] Date of Patent: Jun. 14, 1988

[54] BAND CLAMP

[75] Inventors: Lionel Calmettes; Michel André, both of Romorantin, France

[73] Assignee: Etablissements Caillau, Issy-les-Moulineaux, France

[21] Appl. No.: 24,693

[22] Filed: Mar. 11, 1987

[30] Foreign Application Priority Data

Mar. 27, 1986 [FR] France ................. 86 04476

[51] Int. Cl.[4] ............................. B65D 63/02
[52] U.S. Cl. ................. 24/20 R; 24/20 CW; 24/20 EE
[58] Field of Search ........... 24/20 R, 20 CW, 20 EE, 24/20 TT, 20 W, 23 W, 23 EE, 19, 22, 282

[56] References Cited

U.S. PATENT DOCUMENTS

| | | | |
|---|---|---|---|
| 410,447 | 9/1889 | Rich | 24/20 EE |
| 554,446 | 2/1896 | Jones | 24/20 EE |
| 1,362,784 | 12/1920 | Cooper | 24/282 |
| 1,467,708 | 9/1923 | Cooper | 24/282 |
| 1,746,033 | 2/1930 | Farmer | 24/22 |
| 4,237,584 | 12/1980 | Oetiker | 24/23 EE |
| 4,275,484 | 6/1981 | Irio et al. | 24/20 R |
| 4,299,012 | 11/1981 | Oetiker | 24/20 CW |
| 4,492,004 | 1/1985 | Oetiker | 24/20 R |
| 4,517,708 | 5/1985 | Calmettes et al. | 24/20 CW |

Primary Examiner—Victor N. Sakran
Attorney, Agent, or Firm—Lewis H. Eslinger; Jay H. Maioli

[57] ABSTRACT

The invention relates to a clamp constituted by a band of metal comprising, at each one of its ends, complementary tightening and/or fastening means, whereas the inner end of the band comprises an extension which goes beyond the corresponding fastening means, under the outer end of the band.

In this clamp, the transversal edge of the band, which constitutes the free end of the extension, has a profile indented into the band, such as an Ω-shaped profile, whereas close to its outer end, and on this side of the corresponding tightening and/or fastening means, said band comprises an elongated boss, which projects from its inner face, and is adapted to penetrate into the indented profile of the free end of the extension, said boss having its maximum height substantially equal to the thickness of the band.

6 Claims, 1 Drawing Sheet

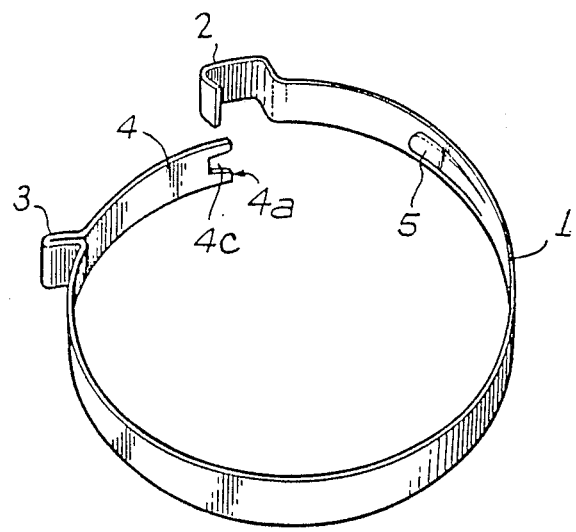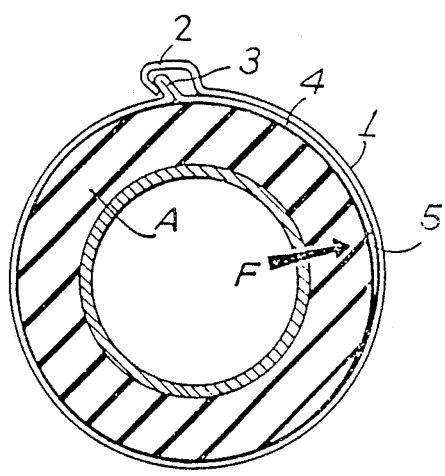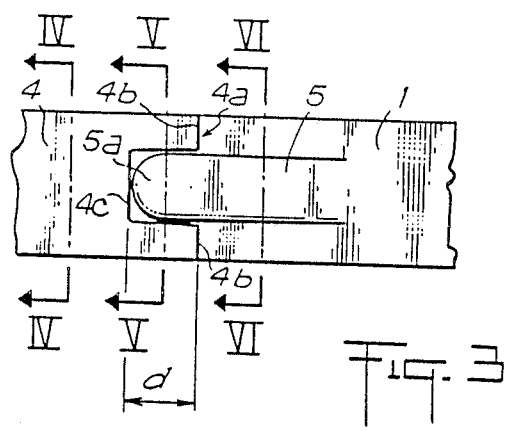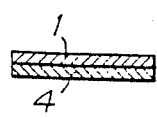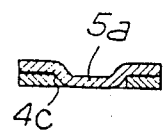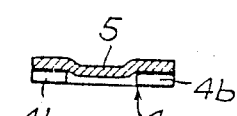

BAND CLAMP

A clamp is already known, particularly from U.S. Pat. No. 4,275,484, which is usable on a flexible hose, such as a rubber or plastic hose, designed to be tightly connected with a rigid pipe, over which the clamp is fitted. Such a clamp is generally constituted by a band of metal would over itself, and comprising at each one of its ends complementary tightening and/or fastening means. One of the ends, called inner end, of the band, comprises an extending portion which goes beyond the corresponding tightening means, under the other end, called the outer end, of the band. Said extension, optionally called a flap, is provided to bridge the gap in the inner periphery of the clamp in the tightening and/or fastening zones, and thus to prevent leakage in the connection of the hose on the rigid pipe.

It has however been found that, in certain cases, leakage may occur due to the presence of a projection or shoulder piece constituted, on the inner periphery of the clamp, by the transversal edge of the free end of the extension.

Various solutions have already been proposed, in particular by U.S. Pat. Nos. 1,467,708 or 1,746,033, and more recently by U.S. Pat. No. 4,299,012, to overcome this drawback.

Besides the fact that these solutions lead to difficulties of production and consequently to greater costs, they are not altogether satisfactory, especially as regards fitting, which for this type of clamp, is required to be easy, in particular in the motorcar industry.

It is the object of the present invention to propose a simple, economical and reliable solution to the problem raised by the projections of the transversal edge of the free end of the extension, such as defined hereinabove.

To this effect, the invention proposes a clamp of the above-described type in which the transversal edge of the free end of the extension or flap has a profile indented into the band, such as for example an $\Omega$-profile or the like. Moreover, close to its outer end and on this side of the corresponding tightening and/or fastening means, the band is provided with an elongated boss which projects from its inner face. Preferably, said boss extends longitudinally, substantially following the axis of the band, and is adapted to penetrate, at least partly, into the indented profile of the free end of the extension.

On the side of the outer end of the band, said boss reaches its maximum height, substantially equal to the thickness of the band, but said height reduces generally to zero, as the boss extends in the direction opposite to said outer end of the band.

Owing to these dispositions, there is no longer any projection or shoulder piece at least over a noticeable part of the width of the band, in the region of the free end of the extension, so that the risks of leaks which had been real until now, are completely eliminated.

The invention will be more readily understood on reading the following description with reference to the accompanying drawings in which:

FIG. 1 is a perspective view of a clamp according to the invention, in open position, FIG. 2 is a cross-section of the clamp according to FIG. 1, fitted and tightened over a hose, FIG. 3 is a view according to arrow F of FIG. 2, with the pipe presumed to be removed, FIGS. 4, 5 and 6 are cross-sections along lines IV—IV, V—V and VI—VI of FIG. 3.

Referring now to the drawings, these show a clamp constituted essentially by a metal band 1 wound over itself. One of its ends is shaped to form a hook 2 whereas the other end comprises a lug piece 3, directed to face outwardly. Beyond said lug piece 3, an extension 4 of the band spreads over a certain distance, which is at least equal to and preferably substantially greater than the length of the hook 2. Said extension 4 constitutes a flap which will be situated under the end bearing the hook 2 when the clamp is closed. For this reason, the end of the band carrying the hook 2 is hereinafter designated the outer end, whereas the end carrying the lug piece 3 and the extension 4 is called the inner end.

A clamp of this type has already been described in U.S. Pat. No. 4,275,484, therefore its advantageous characteristics will not need to be repeated here. It will be merely indicated that the improvement which is about to be described hereinafter is applicable, not only to the clamp described in U.S. Pat. No. 4,275,484, but also to clamps of the same type, comprising both the complementary tightening and/or fastening means provided at the two ends of the band, and an extension situated on the inner end of said band. In general, the transversal edge of the free end of the extension is rectilinear, as described in the aforesaid U.S. Pat. No. 4,275,484, and the disadvantages of such a design have been explained hereinabove.

In the case of the clamp illustrated in the drawings, the transversal edge 4a of the free end of the extension 4 has a rectilinear profile 4b close to the two longitudinal edges of the band, with an indented portion 4c in the center (FIG. 3). The edge 4a thus represents an $\Omega$-shaped profile which is easily obtained by appropriate cutting of the end of the band during production.

Moreover, an elongated boss 5 is provided on the outer end of the band and projects from the inner face thereof, as clearly illustrated in FIGS. 1 and 2. Preferably, and as illustrated in the drawing, said boss is situated along the axis of the band and its transversal dimension is smaller than the width of the band. More precisely, its shape, at least in the region 5a situated on the outer end side, is complementary to that of the indented part 4c of the transversal edge 4a of extension 4.

In said region 5a, the height of the boss 5, inwardly of the clamp, is maximum and substantially equal to the thickness of the band 1. On the contrary, from said region 5a and towards the outer end of the band, the height of the boss reduces progressively to zero.

As known, tightening and fastening of the clamp over a hose A are achieved by bringing the two ends of the band one towards the other until the lug piece 3 engages with the free end of the hook 2, as illustrated in FIG. 2.

As a result, the extension or flap 4 slides under the outer end of the band and the boss 5 must be placed on the band at a distance from its outer end such that the profile of the transversal edge 4a of the extension fits around the end portion 5a of the boss. Then, the central zone of the inner periphery of the band no longer has any projecting part or shoulder, but on the contrary shows a perfectly regular continuity, as can be seen from FIGS. 4 to 6. More precisely, over the peripheral distance d (FIG. 3), the transversal continuity of the band is restored by the engagement of part 5a of the boss into the indented profile 4c, whereas beyond shoulder pieces constituted by the rectilinear parts 4b, continuity of the band is achieved by the decreasing height of the boss 5. Thus, as illustrated in FIG. 2, the hose A is suitably clamped over its entire periphery without any discontinuity and a perfectly tight connection is obtained.

Obviously the invention is not limited to the description given hereinabove and on the contrary, modifications can be brought thereto without departing from its scope. For example, the extension 4 and the outer end of the band can be provided with means for the removable closure of the clamp before this is tightened. Similarly, the outer end can be provided with means adapted to give the clamp a certain reserve of elasticity, while limiting the clamping force exerted on the pipe.

If either one or both of these complementary dispositions are provided on a clamp according to the invention, the extension 4 will then have to be relatively long, whereas the boss 5 will be situated after the complementary means, starting from the outer end of the band.

What is claimed is:

1. A clamp constituted by a band of metal wound over itself, comprising an inner end, an outer end, complementary tightening and/or fastening means proximate each of said ends, an extension portion on said inner end extending beyond the corresponding fastening means under the outer end, wherein the transversal edge of the free end of the extension portion has an indented profile wherein the outer end comprises an elongated boss which projects radially inwardly from an inner face of the band, said boss having an end part which is generally complementary to and adapted to penetrate into and be received by the indented profile of the free end of the extension portion, said boss having its maximum height from the inner face of the band substantially equal to the thickness of the band at the extension portion, whereby when the end part of the boss is received by the indented profile of the extension portion, a transversal continuity is provided across the inner face of the band near the extension portion.

2. Clamp as claimed in claim 1, wherein the boss extends longitudinally, substantially along the axis of the band.

3. Clamp as claimed in claim 1, wherein the height of the boss reduces gradually to zero as the boss extends in the direction opposite to the outer end of the band.

4. Clamp as claimed in claim 1, wherein the thickness of the band metal is substantially uniform along the entire length of the band.

5. Clamp as claimed in claim 1, wherein the complementary tightening and/or fastening means comprises a hook extending from the outer face of the outer end of the band, and a lug piece extending from the outer face of the inner end of the band.

6. Clamp as claimed in claim 1, wherein the indented profile has an $\Omega$-shape.

* * * * *